(12) United States Patent
Yamazaki

(10) Patent No.: US 11,217,865 B2
(45) Date of Patent: Jan. 4, 2022

(54) ELECTRONIC DEVICE INCLUDING POWER STORAGE DEVICE

(71) Applicant: SEMICONDUCTOR ENERGY LABORATORY CO., LTD., Atsugi (JP)

(72) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 742 days.

(21) Appl. No.: 15/500,539

(22) PCT Filed: Jul. 29, 2015

(86) PCT No.: PCT/IB2015/055708
§ 371 (c)(1),
(2) Date: Jan. 31, 2017

(87) PCT Pub. No.: WO2016/020795
PCT Pub. Date: Feb. 11, 2016

(65) Prior Publication Data
US 2017/0222208 A1 Aug. 3, 2017

(30) Foreign Application Priority Data

Aug. 8, 2014 (JP) .............................. JP2014-162915

(51) Int. Cl.
*H01M 10/48* (2006.01)
*H01M 10/42* (2006.01)
(Continued)

(52) U.S. Cl.
CPC .......... *H01M 50/572* (2021.01); *H01G 11/06* (2013.01); *H01G 11/14* (2013.01);
(Continued)

(58) Field of Classification Search
None
See application file for complete search history.

(56) References Cited

U.S. PATENT DOCUMENTS

| 5,339,091 A | 8/1994 | Yamazaki et al. |
| 5,475,398 A | 12/1995 | Yamazaki et al. |

(Continued)

FOREIGN PATENT DOCUMENTS

| CN | 101248546 A | 8/2008 |
| EP | 2366896 A | 9/2011 |

(Continued)

OTHER PUBLICATIONS

International Search Report (Application No. PCT/IB2015/055708) dated Dec. 22, 2015.

(Continued)

*Primary Examiner* — Jonathan Crepeau
*Assistant Examiner* — Angela J Martin
(74) *Attorney, Agent, or Firm* — Nixon Peabody LLP; Jeffrey L. Costellia

(57) ABSTRACT

An object is to prevent deterioration of a battery or to prevent decrease in capacity in storage so as to maximize the charge and discharge performance of the battery and maintain the charge and discharge performance of the battery for a long time. A third electrode or a fourth electrode is provided between a positive electrode and a negative electrode of a secondary battery and a signal (current, voltage, or the like) for inhibiting self-discharge is applied to the third electrode or the fourth electrode, whereby a potential difference between the third electrode and the positive electrode or a potential difference between the third electrode and the negative electrode is adjusted and a chemical reaction in the secondary battery is controlled.

9 Claims, 8 Drawing Sheets

(51) Int. Cl.
*H01M 50/572* (2021.01)
*H01G 11/06* (2013.01)
*H01G 11/14* (2013.01)
*H01G 11/26* (2013.01)
*H01M 10/0525* (2010.01)
*H01M 10/0565* (2010.01)
*H01M 10/0562* (2010.01)
*H01G 11/28* (2013.01)
*H01G 11/56* (2013.01)

(52) U.S. Cl.
CPC .............. *H01G 11/26* (2013.01); *H01G 11/28* (2013.01); *H01G 11/56* (2013.01); *H01M 10/0525* (2013.01); *H01M 10/0562* (2013.01); *H01M 10/0565* (2013.01); *H01M 10/425* (2013.01); *H01M 10/486* (2013.01); *H01M 2300/0082* (2013.01); *Y02E 60/13* (2013.01); *Y02T 10/70* (2013.01)

(56) References Cited

U.S. PATENT DOCUMENTS

| | | | |
|---|---|---|---|
| 7,541,715 | B2 | 6/2009 | Chiang et al. |
| 7,872,396 | B2 | 1/2011 | Chiang et al. |
| 7,923,895 | B2 | 4/2011 | Chiang et al. |
| 7,994,686 | B2 | 8/2011 | Chiang et al. |
| 7,999,435 | B2 | 8/2011 | Chiang et al. |
| 8,093,781 | B2 | 1/2012 | Chiang et al. |
| 8,222,666 | B2 | 7/2012 | Hatano et al. |
| 8,247,946 | B2* | 8/2012 | Chiang ................ F03G 7/005 310/311 |
| 8,310,130 | B2 | 11/2012 | Chiang et al. |
| 8,378,552 | B2 | 2/2013 | Chiang et al. |
| 8,450,769 | B2 | 5/2013 | Hatano et al. |
| 8,604,664 | B2 | 12/2013 | Chiang et al. |
| 8,766,314 | B2 | 7/2014 | Hatano et al. |
| 9,385,399 | B2 | 7/2016 | Ryu et al. |
| 9,425,371 | B2 | 8/2016 | Hatano et al. |
| 9,799,716 | B2 | 10/2017 | Hatano et al. |
| 2007/0085938 | A1* | 4/2007 | Yamazaki .......... H01L 27/1292 349/43 |
| 2011/0123862 | A1 | 5/2011 | Nam et al. |
| 2013/0020903 | A1 | 1/2013 | Chiang et al. |
| 2013/0134415 | A1* | 5/2013 | Godo ................ H01L 29/66969 257/43 |
| 2013/0249348 | A1 | 9/2013 | Chiang et al. |
| 2013/0252064 | A1* | 9/2013 | Kuriki .................... H01G 11/84 429/126 |
| 2013/0265010 | A1* | 10/2013 | Nomura ................ H02J 7/0029 320/134 |
| 2016/0027851 | A1* | 1/2016 | Yanagisawa ........ H01L 29/7869 257/43 |

FOREIGN PATENT DOCUMENTS

| | | | | |
|---|---|---|---|---|
| EP | 2538080 | A | 12/2012 | |
| JP | 63-015796 | A | 1/1988 | |
| JP | 07-272771 | A | 10/1995 | |
| JP | 08-190934 | A | 7/1996 | |
| JP | H08190934 | A * | 7/1996 | ............ H01M 10/05 |
| JP | 08-340641 | A | 12/1996 | |
| JP | 10-312827 | | * 11/1998 | ............ H01M 10/40 |
| JP | 10-312827 | A | 11/1998 | |
| JP | 2010-073558 | A | 4/2010 | |
| JP | 2010-165673 | A | 7/2010 | |
| JP | 2011-113976 | A | 6/2011 | |
| JP | 2013-175549 | A | 9/2013 | |
| JP | 2015-141864 | A | 8/2015 | |
| KR | 2011-0056937 | A | 5/2011 | |
| WO | WO-2005/124918 | | 12/2005 | |
| WO | WO-2007/029941 | | 3/2007 | |
| WO | WO-2008/036122 | | 3/2008 | |
| WO | WO-2008/094196 | | 8/2008 | |
| WO | WO-2009/123672 | | 10/2009 | |
| WO | WO-2010/071089 | | 6/2010 | |

OTHER PUBLICATIONS

Written Opinion (Application No. PCT/IB2015/055708) dated Dec. 22, 2015.
Chinese Office Action (Application No. 201580042570.X) dated Nov. 1, 2018.

* cited by examiner charge time

ELECTRONIC DEVICE INCLUDING POWER STORAGE DEVICE

TECHNICAL FIELD

One embodiment of the present invention relates to an object, a method, or a manufacturing method. The present invention relates to a process, a machine, manufacture, or a composition of matter (a composition of matter). One embodiment of the present invention relates to a method for manufacturing a semiconductor device, a display device, a light-emitting device, a power storage device, a lighting device, or an electronic device. In particular, one embodiment of the present invention relates to an electronic device and its operating system.

Note that electronic devices in this specification mean all devices including power storage devices, and electro-optical devices including power storage devices, information terminal devices including power storage devices, and the like are all electronic devices.

BACKGROUND ART

Electronic devices carried around by the users and electronic devices worn by the users have been actively developed. For example, a thin portable electronic book is disclosed in Patent Document 1.

The electronic devices carried around by the users and the electronic devices worn by the users operate using secondary batteries as power sources. It is desired that an electronic device carried around by the user can be used for a long period, and in order to achieve this, a high-capacity secondary battery is favorably used. Since a high-capacity secondary battery is large in size, its incorporation in an electronic device has a problem of increasing the weight of the electronic device. Thus, small or thin high-capacity secondary batteries that can be incorporated in portable electronic devices are under development.

Keeping a secondary battery in a fully charged state might degrade the battery. In particular, self-discharge of the battery when kept at high temperatures causes leakage, which results in decrease in a battery capacity without use.

REFERENCE

Patent Document

[Patent Document 1] Japanese Published Patent Application No. S63-15796

SUMMARY OF THE INVENTION

Problems to be Solved by the Invention

The performance required for secondary batteries includes increased energy density, improved cycle life, safe operation under a variety of environments, and longer-term reliability.

A secondary battery deteriorates due to repeated charge and discharge, and the capacity thereof is gradually decreased. In addition, a secondary battery has a problem in that its capacity is gradually decreased due to decrease in the electromotive force or occurrence of leakage by spontaneous discharge even when the secondary battery is only kept without use. In terms of the battery efficiency, the capacity decrease is preferably small.

Thus, an object is to prevent deterioration of a power storage device or to prevent decrease in capacity in storage so as to maximize the charge and discharge performance of the battery and maintain the charge and discharge performance of the battery for a long time.

There are also some power storage devices that produce heat, expand, ignite, or explode because of any cause even though they were able to be charged and discharged without any problem at the time of manufacture and were shipped as quality products. Hence, another object is to ensure the safety of a power storage device.

An object of one embodiment of the present invention is to provide an innovative power management system of a power storage device, an innovative secondary battery, or the like. Note that the descriptions of these objects do not disturb the existence of other objects. In one embodiment of the present invention, there is no need to achieve all the objects. Other objects will be apparent from the description of the specification, the drawings, the claims, and the like, and other objects can be derived from the description of the specification, the drawings, the claims, and the like.

Means for Solving the Problems

A current interruption means or a current control means is provided between a positive electrode and a negative electrode of a secondary battery and a chemical reaction in the secondary battery is inhibited by the current interruption means or the current control means, whereby an electric power stored in the secondary battery is retained, i.e., decrease in the capacity of the secondary battery is prevented.

Specifically, the secondary battery is a three-terminal device or a four-terminal electronic device. A third electrode or a fourth electrode is provided between the positive electrode and the negative electrode of the secondary battery and a desired signal (current, voltage, or the like) is applied to the third electrode or the fourth electrode, whereby a potential difference between the third electrode and the positive electrode or a potential difference between the third electrode and the negative electrode is adjusted and the chemical reaction in the secondary battery is controlled.

Although depending on a structure of the secondary battery, a signal voltage applied to the third electrode, or a signal voltage applied to the fourth electrode, the chemical reaction in the secondary battery can be stopped or inhibited, and the leakage of the secondary battery can be suppressed, which can result in contribution to longer life of the secondary battery. The flow of microcurrent between a positive electrode and a negative electrode is considered as a major factor of self-discharge of a secondary battery that is left unconnected with a load, a charger, or the like; thus, a chemical reaction gradually proceeds in the battery, so that the capacity of the battery is decreased correspondingly. One mechanism of this flow of microcurrent is that a structure for interrupting or controlling the microcurrent is not provided between the positive electrode and the negative electrode and carrier ions such as lithium ions easily move between the positive electrode and the negative electrode in both directions. On the basis of the above knowledge, the current interruption means or the current control means is provided between the positive electrode and the negative electrode of the secondary battery to partly inhibit a chemical reaction inside the secondary battery. The current interruption means or the current control means applies a signal for preventing self-discharge to the third electrode or the fourth electrode to change an electric field between the first electrode and the second electrode.

A secondary battery is a battery that can convert a difference in chemical energy accompanying an electrochemical reaction into electric energy to discharge it, and can further convert the electric energy into chemical energy to charge the battery by flowing current in a direction opposite to that in discharge.

In the case where a small secondary battery is mounted on an LSI chip, when the size of one secondary battery is on the μm order, its capacity is small, and it is difficult to retain the capacity; however, the present invention enables retention of the capacity. An FET (also referred to as an OS transistor) using an oxide semiconductor including In, Ga, and Zn is given as an FET with small off-state current. A novel device can be provided by a combination with a memory including an FET whose channel is formed using such an oxide semiconductor, a protective circuit including an FET whose channel is formed using such an oxide semiconductor, or the like.

In other words, by a combination of a secondary battery with small leakage current and an FET with small leakage current, an electronic device whose total leakage current is ultimately suppressed can be provided.

Unless otherwise specified, the off-state current in this specification refers to a drain current of a transistor in the off state (also referred to as non-conduction state or cutoff state). Unless otherwise specified, the off state of an n-channel transistor means that the voltage Vgs between its gate and source is lower than the threshold voltage Vth, and the off state of a p-channel transistor means that the voltage Vgs between its gate and source is higher than the threshold voltage Vth. For example, the off-state current of an n-channel transistor sometimes refers to a drain current that flows when the voltage Vgs between its gate and source is lower than the threshold voltage Vth.

The off-state current of a transistor depends on Vgs in some cases. For this reason, when there is Vgs at which the off-state current of a transistor is smaller than or equal to I, it may be said that the off-state current of the transistor is smaller than or equal to I. The off-state current of a transistor may refer to an off-state current at given Vgs, an off-state current at Vgs in a given range, or an off-state current at Vgs at which sufficiently small off-state current is obtained.

As an example, the assumption is made of an n-channel transistor in which the threshold voltage Vth is 0.5 V and the drain current is $1\times10^{-9}$ A at Vgs of 0.5 V, the drain current is $1\times10^{-13}$ A at Vgs of 0.1 V, the drain current is $1\times10^{-19}$ A at Vgs of −0.5 V, and the drain current is $1\times10^{-22}$ A at Vgs of −0.8 V. The drain current of the transistor is $1\times10^{-19}$ A or smaller at Vgs of −0.5 V or at Vgs in the range of −0.5 V to −0.8 V; therefore, it can be said that the off-state current of the transistor is $1\times10^{-19}$ A or smaller. Since there is Vgs at which the drain current of the transistor is $1\times10^{-22}$ A or smaller, it may be said that the off-state current of the transistor is $1\times10^{-22}$ A or smaller.

In this specification, the off-state current of a transistor with a channel width W is sometimes represented by a value in relation to the channel width W. Alternatively, it is sometimes represented by a current value per given channel width (e.g., 1 μm). In the latter case, the unit of the off-state current may be represented by current/length (e.g., A/μm).

The off-state current of a transistor depends on temperature in some cases. Unless otherwise specified, the off-state current in this specification may be an off-state current at room temperature, 60° C., 85° C., 95° C., or 125° C. Alternatively, the off-state current may be an off-state current at a temperature at which the reliability of a semiconductor device or the like including the transistor is ensured or a temperature at which the semiconductor device or the like including the transistor is used (e.g., temperature in the range of 5° C. to 35° C.). When there is Vgs at which the off-state current of a transistor at room temperature, 60° C., 85° C., 95° C., 125° C., a temperature at which the reliability of a semiconductor device or the like including the transistor is ensured, or a temperature at which the semiconductor device or the like including the transistor is used (e.g., temperature in the range of 5° C. to 35° C.) is smaller than or equal to I, it may be said that the off-state current of the transistor is smaller than or equal to I.

The off-state current of a transistor depends on voltage Vds between its drain and source in some cases. Unless otherwise specified, the off-state current in this specification may be an off-state current at Vds with an absolute value of 0.1 V, 0.8 V, 1 V, 1.2 V, 1.8 V, 2.5 V, 3 V, 3.3 V, 10 V, 12 V, 16 V, or 20 V. Alternatively, the off-state current may be an off-state current at Vds at which the reliability of a semiconductor device or the like including the transistor is ensured or Vds at which the semiconductor device or the like including the transistor is used. When there is Vgs at which the off-state current of a transistor is smaller than or equal to I at given Vds, it may be said that the off-state current of the transistor is smaller than or equal to I. Here, given Vds is, for example, 0.1 V, 0.8 V, 1 V, 1.2 V, 1.8 V, 2.5 V, 3 V, 3.3 V, 10 V, 12 V, 16 V, 20 V, Vds at which the reliability of a semiconductor device or the like including the transistor is ensured, or Vds at which the semiconductor device or the like including the transistor is used.

In the above description of the off-state current, a drain may be replaced with a source. That is, the off-state current sometimes refers to a current that flows through a source of a transistor in the off state.

In this specification, leakage current sometimes expresses the same meaning as off-state current.

In this specification, the off-state current sometimes refers to a current that flows between a source and a drain when a transistor is off, for example.

A structure of the invention disclosed in this specification is a secondary battery including a first electrode, a second electrode, and a current interruption means or a current control means between the first electrode and the second electrode.

In the above structure, the current interruption means or the current control means includes a third electrode or a fourth electrode. Specifically, the third electrode or the fourth electrode is a mesh-like electrode. The mesh-like electrode is surrounded by organic resin layers from the above and the below, and as a result, a secondary battery in which the mesh-like electrode is placed in the organic resin is formed. Alternatively, the third electrode may be a comb-like electrode and the fourth electrode may also be a comb-like electrode, and they may be combined with each other. Alternatively, a plurality of linear third electrodes may be provided in X direction, a plurality of linear fourth electrodes may be provided in Y direction perpendicular to X direction, and an insulating layer may be provided therebetween, so that the third electrodes and the fourth electrodes may intersect with each other.

Furthermore, a fifth electrode may be provided, so that a battery including three or more electrodes (terminals) may be formed. For example, the fifth electrode is an electrode for controlling temperature or an electrode for measuring the charged energy to prevent overcharge. For another example, the fifth electrode is an electrode for measuring temperature in the secondary battery.

In the case where the present invention is applied to a lithium-ion secondary battery using an electrolytic solution, the organic resin layers between which the mesh-like electrode is provided can be regarded as separators.

The present invention may be applied to one or a plurality of storage batteries of a lithium-ion polymer secondary battery including a gelled high-molecular material as a solvent of an electrolytic solution, a lithium-ion capacitor, an electric double-layer capacitor, and a redox capacitor.

The present invention may be applied to an all-solid-state thin-film lithium-ion secondary battery by using a solid electrolyte.

A signal applied by the current interruption means or the current control means is preferably generated using a different power source, and the different power source is a battery of a different type with little self-discharge. Alternatively, without using a different power source, regenerative energy of a vehicle or the like can be used depending on an electronic device on which the secondary battery is mounted. For example, in the case of a secondary battery mounted on an electric vehicle, a signal is generated using its regenerative energy, and the signal is applied to the third electrode of the secondary battery.

In the case where a plurality of small-sized batteries is provided in an electronic device, it is preferred that at least one of them be a secondary battery that can be wirelessly charged.

An antenna included in an electronic device constitutes a communication module that realizes a contactless charging function. The communication module may use a charging method that meets a standard such as Qi (chi) or Powermat. At the time of charging, a plurality of batteries may be controlled to be charged at a time. The antenna included in the electronic device may constitute a communication module that realizes a near-field wireless communication function.

A MEMS can be combined with an electronic device in which small-sized batteries are dispersed and placed. For example, an electronic device including a small-sized battery for supplying electric power to a sensor using MEMS and a detection circuit, a small-sized battery for supplying electric power to a CPU, and a small-sized battery for supplying electric power to a memory storing data detected by the sensor can be obtained.

In the case where a plurality of kinds of sensors is included in an electronic device, since a battery is provided for each component to be used, the user can selectively attach the sensor the user wants to use or can detach the sensor. For example, if a control circuit that can control a pulse sensor, a temperature sensor, a positional information sensor (e.g., a GPS), an acceleration sensor, an angular velocity sensor, and the like, and a connection portion (a connection socket) to connect them are provided in an electronic device, which is wrapped around the arm, the user can select the sensor depending on the function the user wants to use, and the sensor may be connected to the electronic device. In that case, each of the sensors has a small-sized battery and a regulator; when a larger number of functions are used, a larger number of small-sized batteries are connected, and thus, an electronic device having a plurality of small-sized batteries is obtained.

When a transistor (OS transistor) using an oxide semiconductor layer is used for a transistor included in a regulator, reduction in power consumption can be achieved because the off-state current is small. In particular, a regulator (DC-DC converter) including a control circuit including OS transistors can operate at a high temperature of 150° C. or higher. Thus, such a DC-DC converter of an embodiment is preferably used for an electronic device that is likely to operate at high temperatures.

If something abnormal occurs, a pulsed voltage is applied to the current interruption means or the current control means including the third electrode or the fourth electrode to cause partly short circuit by intention, so that the secondary battery can be automatically shut down so as not to function, which can also ensure safety. Specifically, short circuit only between the positive electrode and the third electrode or short circuit only between the third electrode and the negative electrode can result in a state in which the secondary battery hardly functions.

Here, a current flow at the time of charging is described with reference to FIG. 4A. When a battery using lithium is regarded as a closed circuit, lithium ions transfer and a current flows in the same direction. Note that in the battery using lithium, an anode (anode) and a cathode (cathode) change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" or "+ electrode (plus electrode)" and the negative electrode is referred to as a "negative electrode" or "− electrode (minus electrode)" in all the cases where charge is performed, discharge is performed, a reverse pulse current is supplied, and a charging current is supplied. The use of the terms anode (anode) and cathode (cathode) related to an oxidation reaction and a reduction reaction might cause confusion because the anode and the cathode change places at the time of charging and discharging. Thus, the terms anode (anode) and cathode (cathode) are not used in this specification. If the term anode (anode) or cathode (cathode) is used, whether it is at the time of charging or discharging is noted and whether it corresponds to a positive electrode (plus electrode) or a negative electrode (minus electrode) is also noted.

Two terminals in FIG. 4A are connected to a charger, and a storage battery 400 is charged. As the charge of the storage battery 400 proceeds, a potential difference between electrodes increases. The positive direction in FIG. 4A is the direction in which a current flows from a terminal outside the storage battery 400 to a positive electrode 402, flows from the positive electrode 402 to a negative electrode 404 in the storage battery 400, and flows from the negative electrode to a terminal outside the storage battery 400. In other words, a direction in which a charging current flows is regarded as a direction of a current.

A third electrode (or a fourth electrode) is provided in a secondary battery. A signal for inhibiting self-discharge is applied, and control is performed so that the positive electrode 402 and the negative electrode 404 in the secondary battery are brought into an interruption state. Thus, the self-discharge, i.e., leakage current, of the secondary battery is reduced. For example, in the case where a third electrode is provided as a current interruption means or a current control means between the positive electrode 402 and the negative electrode 404 while the secondary battery and a load are not electrically connected to each other, setting the potential of a signal applied to the third electrode at the same level as that of the potential of the positive electrode 402 can create a state in which current can hardly flow between the positive electrode 402 and the third electrode. A potential difference between the third electrode and the negative electrode 404 is generated, but a chemical reaction does not occur between the third electrode and the negative electrode 404. When the potential of the signal applied to the third electrode is at the same level as that of the potential of the negative electrode 404, current can hardly flow between the negative electrode 404 and the third electrode. A potential difference occurs between the third electrode and the positive electrode 402 is generated, but a chemical reaction does not occur between the third electrode and the positive electrode 402. Accordingly, in the whole storage battery 400, current can be interrupted or controlled by the current interruption means or the current control means, so that leakage current of the storage battery 400 can be reduced, preferably, leakage current of the storage battery 400 can be fundamentally eliminated.

The self-discharge rate and the self-discharge amount are given as indicators used for quantification of self-discharge. The self-discharge rate is a self-discharge amount (unit mAh/day) of a secondary battery per unit time (per day), and the self-discharge amount is a discharge amount due to self-discharge in a state where a secondary battery is left unconnected with a load, a charger, or the like. Note that the self-discharge rate and the spontaneous discharge amount may be changed by not only the elapsed days and the ambient temperature where the secondary battery is left but also the charge capacity. Accordingly, in this specification, the remaining battery capacity is measured after a secondary battery in a fully charged state is left in a room-temperature atmosphere. The self-discharge rate is defined as a proportion of decrease in discharge capacity after being left for a certain time to a discharge capacity at the initial cycle of 100%. The self-discharge rate is 1%/day or lower, preferably 0.1%/day or lower.

Effect of the Invention

A battery in which self-discharge is minimized and leakage current hardly flows is provided; thus, a device incorporating the battery can be used for a long time.

Alternatively, by a combination of a secondary battery with small leakage current and an FET with small leakage current, an electronic device whose total leakage current is ultimately suppressed can be provided.

BEST MODE FOR CARRYING OUT THE INVENTION

Hereinafter, embodiments of the present invention will be described in detail with reference to the drawings. Note that the present invention is not limited to the description below, and it is easily understood by those skilled in the art that modes and details can be modified in various ways. In addition, the present invention should not be construed as being limited to the description in the embodiments given below.

Embodiment 1

A power storage device of one embodiment of the present invention is specifically described below.

Figure 1A:
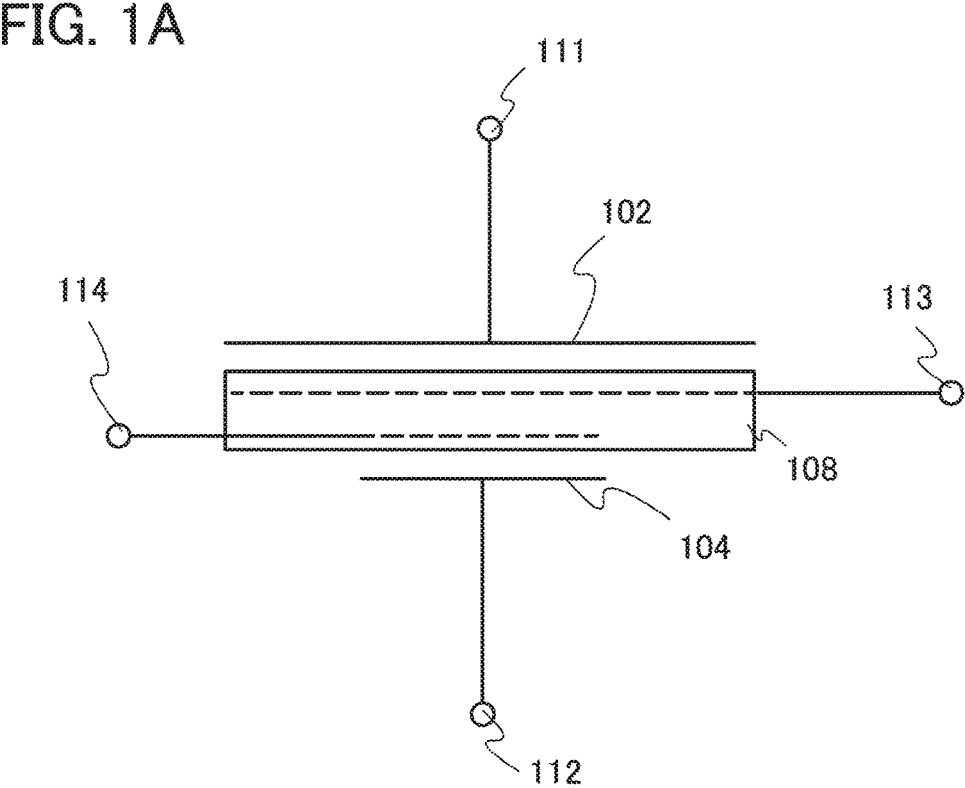
FIGS. 1A and 1B are conceptual views each illustrating one embodiment of the present invention.
Figure 1B:
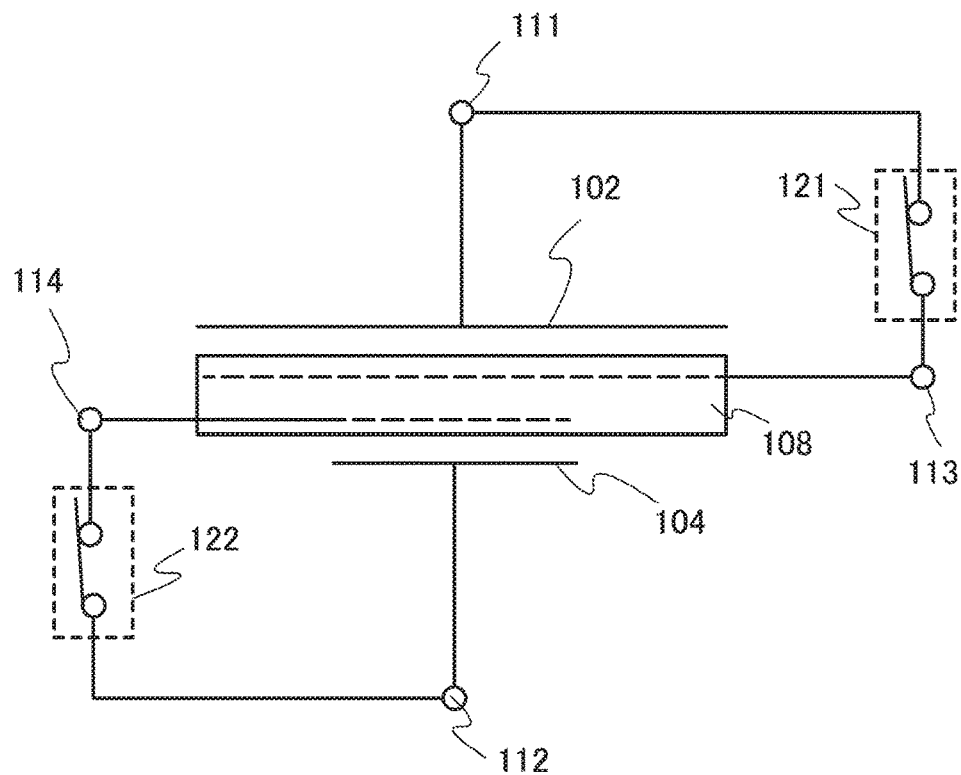

FIG. 1A is a conceptual view illustrating a secondary battery including four terminals. Although FIGS. 1A and 1B show an example of a secondary battery including four terminals, it is not particularly limited as long as a current interruption means or a current control means is provided between a positive electrode and a negative electrode, and a secondary battery including three terminals or a secondary battery including five or more terminals may be provided. One of a plurality of terminals may have a safety function of measuring the temperature of a secondary battery and stopping charge or discharge when the temperature exceeds a certain temperature. At least one of the plurality of terminals may have a safety function of measuring the remaining battery level of the secondary battery and managing the charge state of the secondary battery.

The power storage device in FIGS. 1A and 1B illustrates an example of the case of a lithium-ion secondary battery using an electrolytic solution. A first terminal 111 is a terminal at the same potential level as that of a positive electrode, and a second terminal 112 is a terminal at the same potential level as that of a negative electrode. The first terminal 111 and the second terminal 112 are connected to a load when an electronic device which uses the power storage device illustrated in FIGS. 1A and 1B as a power source is in use. In charging the power storage device, the first terminal 111 and the second terminal 112 are connected to a charger.

A layer 108 is a current interruption means or a current control means, and is a layer including a mesh-like electrode. In FIG. 1A, two mesh-like electrodes are provided in the layer 108; one is connected to the third terminal 113, and the other is electrically connected to the fourth terminal 114. The shape of the electrodes provided in the layer 108 is not limited to a mesh-like shape, and may be a comb-like shape, a line shape, or the like.

A signal for inhibiting self-discharge is applied to one or both of the mesh-like electrodes so that self-discharge of the secondary battery which is left unconnected with a load, a charger, or the like is prevented. Application of the signal for inhibiting self-discharge partly prevents a chemical reaction in the secondary battery. The signal for inhibiting self-discharge is a signal for keeping equilibrium in which a chemical reaction is unlikely to occur between a first terminal and a second terminal, for example, between an active material and an electrolytic solution (or a solid electrolyte). Alternatively, the signal for inhibiting self-discharge may be a signal for performing charging to compensate for the self-discharge amount.

For example, as illustrated in FIG. 1B, a first switch 121 may be provided, the first switch may be turned on, and the first terminal and the third terminal may be set at the same potential level, whereby current does not fundamentally flow between the first terminal and the third terminal. This can make microcurrent difficult to flow, and thus, the self-discharge can be suppressed.

Furthermore, as illustrated in FIG. 1B, a second switch 122 may be provided, the second switch may be turned on, and the second terminal and the fourth terminal may be set at the same potential level, whereby current does not fundamentally flow between the second terminal and the fourth terminal. This can make microcurrent difficult to flow, and thus, the self-discharge can be suppressed.

When the first switch and the second switch are turned on, the first terminal and the third terminal are set at the same potential level, the second terminal and the fourth terminal are set at the same potential level, and a potential difference is generated between the two mesh-like electrodes in the layer 108; however, current hardly flows when the layer 108 is formed using an insulating material. Thus, an electrochemical reaction of the battery can be suppressed.

In this embodiment, an example is shown in which the first terminal and the third terminal are electrically connected by turning on the switch to set the terminals at the same potential level; however, there is no particular limitation. The potential of the third terminal may be controlled to be the same as a first potential with the use of another power source or another circuit.

When the layer 108 is formed using a resin material through which carrier ions such as lithium ions can pass, like a separator, a signal that applies different voltages alternately may be applied between the two mesh-like electrodes, whereby transfer of carrier ions between the two mesh-like electrodes can be controlled.

When a circuit and a power source for generating a signal for turning on or off the first switch 121 or the second switch 122 are separately provided and the storage battery of this embodiment is used for an electric vehicle, for example, its regenerative energy may be used to generate the signal. The power source for generating a signal for turning on or off the first switch 121 or the second switch 122 is not limited to a storage battery, and a power-generating element, a solar cell, or the like can alternatively be used.

Note that an exterior body, a positive electrode active material, a negative electrode active material, an electrolytic solution, and the like are not illustrated in FIG. 1A for simplicity. A circuit for signal generation and the like are also not illustrated for simplicity.

It is preferable that an OS transistor with small off-state current be used as the first switch 121 or the second switch 122 and that the off-state current of the OS transistor be smaller than or equal to $1 \times 10^{-19}$ A. By a combination of the storage battery of this embodiment and an OS transistor with small leakage current, an electronic device whose total leakage current is ultimately suppressed can be provided.

Note that one embodiment of the present invention is not limited thereto. For example, depending on circumstances or conditions, a variety of switches can be used as a switch. A switch has a function of determining whether to let current flow or not by being brought into a conduction state (on state) or a non-conduction state (off state). Alternatively, a switch has a function of selecting and changing a current path; for example, a switch has a function of determining whether current can flow through a path 1 or a path 2 and switching the paths. For example, an electrical switch, a mechanical switch, or the like can be used as a switch. That is, any element can be used as a switch as long as it can control current, without limitation to a certain element. For example, a transistor (e.g., a bipolar transistor or a MOS transistor), a diode (e.g., a PN diode, a PIN diode, a Schottky diode, an MIM (Metal Insulator Metal) diode, an MIS (Metal Insulator Semiconductor) diode, or a diode-connected transistor), a logic circuit in which such elements are combined, or the like can be used as a switch. An example of a mechanical switch is a switch formed using a MEMS (micro electro mechanical systems) technology, such as a digital micromirror device (DMD). Such a switch includes an electrode that can be moved mechanically, and operates by controlling conduction and non-conduction in accordance with movement of the electrode.

The storage battery described in this embodiment is also effective in the case of miniaturization of a storage battery. For example, a structure in which an OS transistor and a storage battery are formed over a semiconductor substrate may be employed. In the case where a storage battery is formed over a semiconductor substrate, an electrolytic solution is difficult to handle; thus, a solid electrolyte is preferably used instead of the electrolytic solution. Specifically, a structure in which an OS transistor and a storage battery including a solid electrolyte are formed over a semiconductor substrate may be used. Since the leakage current of an OS transistor is extremely small, capacity decrease of the storage battery due to self-discharge can also be reduced as compared with the case of a storage battery including a transistor using silicon.

Embodiment 2

Embodiment 1 describes an example of the storage battery including four terminals, and this embodiment describes an example of a storage battery including three terminals. Note that the description is made with the same reference numerals for the same portions as those in FIGS. 1A and 1B.

Figure 2A:
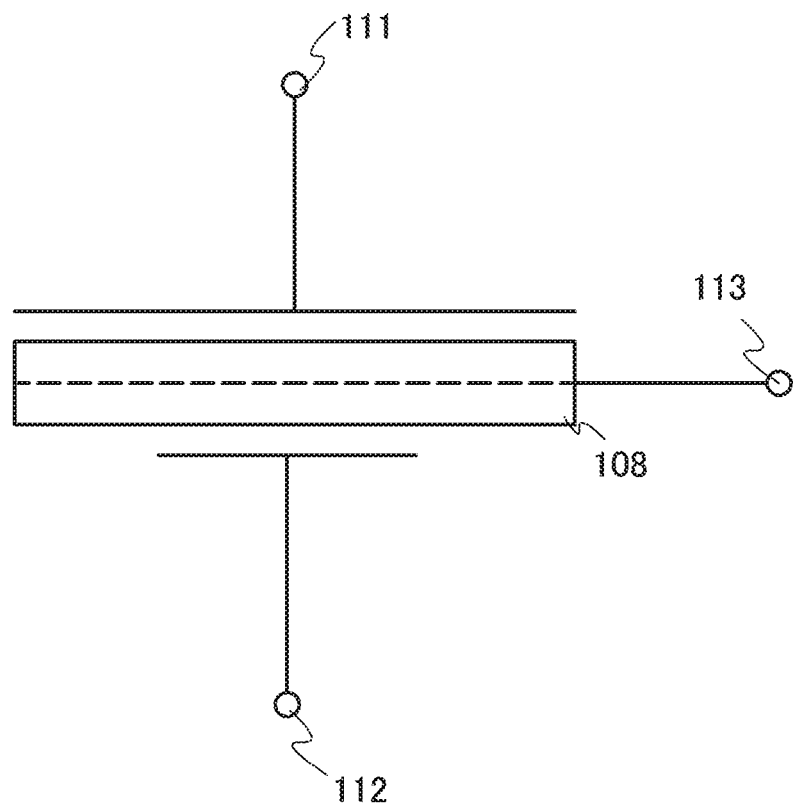
FIGS. 2A and 2B are conceptual views each illustrating one embodiment of the present invention.

FIG. 2A is a conceptual view illustrating a secondary battery including three terminals.

Figure 2B:
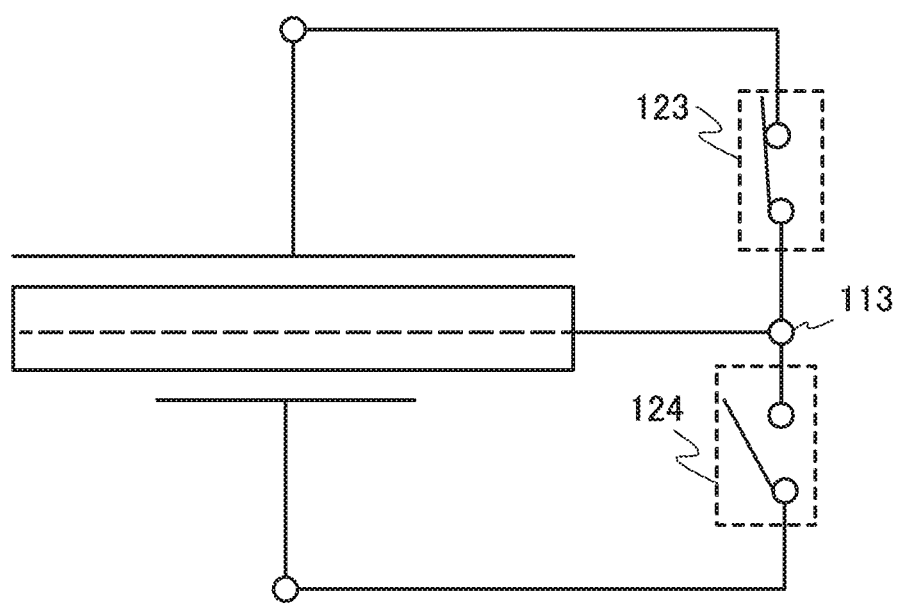

The power storage device in FIGS. 2A and 2B illustrates an example of the case of a lithium-ion secondary battery using an electrolytic solution. The first terminal 111 is a terminal at the same potential level as that of a positive electrode, and the second terminal 112 is a terminal at the same potential level as that of a negative electrode. The first terminal 111 and the second terminal 112 are connected to a load when an electronic device which uses the power storage device illustrated in FIGS. 2A and 2B as a power source is in use. In charging the power storage device, the first terminal 111 and the second terminal 112 are connected to a charger.

The layer 108 is a current interruption means or a current control means, and is a layer including a mesh-like electrode. In FIG. 2A, a mesh-like electrode is provided in the layer 108 and is connected to the third terminal 113. The shape of the electrode provided in the layer 108 is not limited to a mesh-like shape, and may be a comb-like shape, a line shape, or the like.

A signal for inhibiting self-discharge is applied to the mesh-like electrode so that self-discharge of the secondary battery which is left unconnected with a load, a charger, or the like is prevented. Application of the signal for inhibiting self-discharge partly prevents a chemical reaction in the secondary battery.

For example, as illustrated in FIG. 2B, a first switch 123 and a second switch 124 may be provided, the first switch may be turned on, the second switch may be turned off, and the first terminal and the third terminal may be set at the same potential level, whereby current does not fundamentally flow between the first terminal and the third terminal.

This can make microcurrent difficult to flow, and thus, the self-discharge can be suppressed.

Furthermore, the first switch may be turned off, the second switch may be turned on, and the second terminal and the third terminal may be set at the same potential level, whereby current does not fundamentally flow between the second terminal and the third terminal. This can make microcurrent difficult to flow, and thus, the self-discharge can be suppressed.

In the structure illustrated in FIG. 2B, the battery is short-circuited when both the first switch 123 and the second switch 124 are turned on; accordingly, the battery may be protected by a structure in which a capacitor is provided between the first terminal and the third terminal or a structure in which a capacitor is provided between the second terminal and the third terminal.

This embodiment can be freely combined with Embodiment 1.

Embodiment 3

In this embodiment, an example of a method for manufacturing a secondary battery is described below.

First, a first current collector 301 is prepared. The first current collector 301 may be formed over a semiconductor substrate by a sputtering method or formed over a glass substrate by a sputtering method. Alternatively, a metal substrate or a metal foil may be used.

Then, a first active material layer 302, a first organic resin layer 303, and a conductive layer 304 are stacked over the first current collector 301.

A mixture of an active material and a solid electrolyte is used for the first active material layer 302. Examples of the solid electrolyte are a sulfide-based solid electrolyte and an oxide-based solid electrolyte.

Examples of the sulfide-based solid electrolyte are lithium complex sulfide materials such as $Li_7P_3S_{11}$, $Li_{3.25}P_{0.95}S_4$, $Li_{10}GeP_2S_{12}$, $Li_{3.25}Ge_{0.25}P_{0.75}S_4$, $Li_2S-P_2S_5$, $Li_2S-GeS_2$, $Li_2S-SiS_2-Li_3PO_4$, $Li_2S-SiS_2-Ga_2S_3$, $Li_2S-SiS_2-Li_4SiO_4$, $LiI-Li_2S-P_2S_5$, $LiI-Li_2S-B_2S_3$, and $LiI-Li_2S-SiS_2$.

Examples of the oxide-based solid electrolyte are lithium oxides and lithium oxide materials, such as $Li_3Al_{0.3}Ti_{1.7}(PO_4)_3$, $Li_{1.07}Al_{0.69}Ti_{1.46}(PO_4)_3$, $Li_4SiO_4-Li_3BO_3$, $Li_{2.9}PO_{3.3}N_{0.46}$, $Li_{3.6}Si_{0.6}P_{0.4}O_4$, $Li_{1.5}Al_{0.5}Ge_{1.6}(PO_4)_3$, $Li_2O$, $Li_2CO_3$, $Li_2MoO_4$, $Li_3PO_4$, $Li_3VO_4$, $Li_4SiO_4$, LLT ($La_{2/3-x}Li_{3x}TiO_3$), and LLZ($Li_7La_3Zr_2O_{12}$).

A polypropylene resin, a polyethylene resin, a polyolefin resin, a polyimide resin, a polyamide resin (e.g., nylon, aramid), or the like is used for the first organic resin layer 303.

Figure 3A:
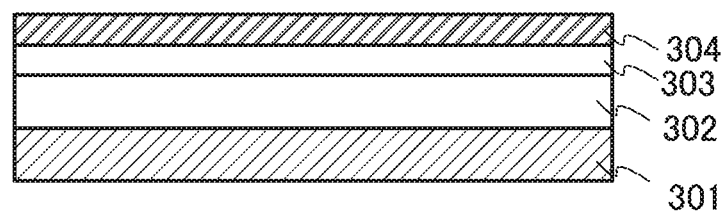
FIGS. 3A to 3C are cross-sectional views illustrating manufacturing steps of one embodiment of the present invention.

The conductive layer 304 of gold, silver, copper, aluminum, or the like is formed by a sputtering method, an evaporation method, or a CVD method. FIG. 3A illustrates a cross section up to this step.

Figure 3B:
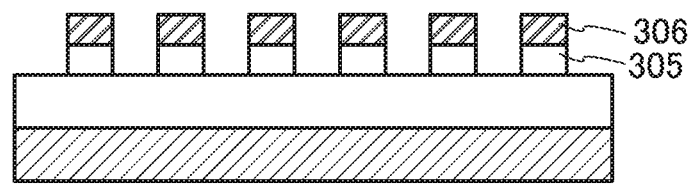

Next, as illustrated in FIG. 3B, patterning is performed, whereby a mesh-like electrode 306 is formed. A mesh-like organic resin layer 305 is forming under the mesh-like electrode 306.

Then, a second organic resin layer 307 is formed to cover side surfaces and a top surface of the conductive layer. The layer 108 in which the mesh-like electrode 306 is provided in the organic resin layer is formed. The layer 108 has a structure that allows carrier ions such as lithium ions to pass therethrough.

A second active material layer 308 is formed. A mixture of an active material and a solid electrolyte is used for the second active material layer.

Figure 3C:
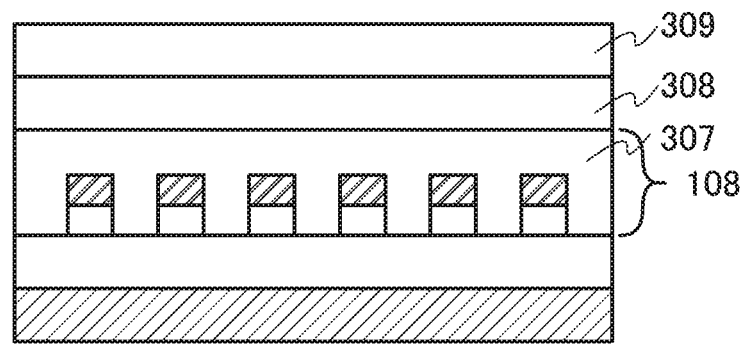
Figure 4:
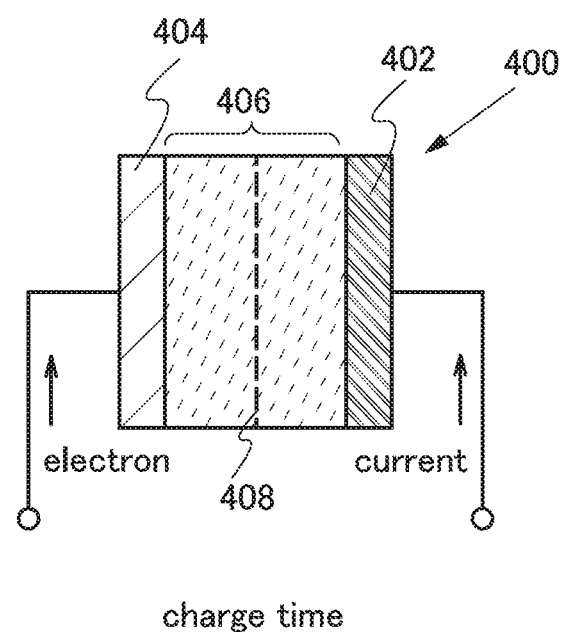
FIG. 4 is a conceptual cross-sectional view showing charging of a storage battery.

Then, a second current collector 309 is formed. FIG. 3C illustrates a cross section up to this step.

Furthermore, a solid electrolyte layer may be provided between the layer 108 and the second active material layer 308. A solid electrolyte layer may be provided between the layer 108 and the first active material layer 302.

In the case where the first current collector serves as a positive electrode current collector, the first active material layer includes a positive electrode active material, the second active material layer includes a negative electrode active material, and the second current collector serves as a negative electrode current collector.

The positive electrode current collector may be formed to have a single-layer or stacked-layer structure using one or more of titanium (Ti), aluminum (Al), gold (Au), and platinum (Pt).

As the positive electrode active material, one or more kinds of lithium cobaltate, lithium iron phosphate, lithium manganite, lithium nickelate, and vanadium oxide are used.

The negative electrode active material may be formed to have a single-layer or stacked-layer structure using one or more of carbon (C), silicon (Si), germanium (Ge), tin (Sn), aluminum (Al), lithium (Li), lithium titanium oxide, lithium niobate, niobium oxide, tantalum oxide, and silicon oxide.

The negative electrode current collector may be formed to have a single-layer or stacked-layer structure using one or more of titanium (Ti), copper (Cu), stainless steel, iron (Fe), gold (Au), platinum (Pt), and nickel (Ni).

In the case where the first current collector serves as a negative electrode current collector, the first active material layer includes a negative electrode active material, the second active material layer includes a positive electrode active material, and the second current collector serves as a positive electrode current collector.

Although an example in which the mesh-like electrode 306 is provided between the first current collector and the second current collector is described in this embodiment, there is no particular limitation, and a mesh-like electrode may be additionally formed so that two mesh-like electrodes may be included. The self-discharge is prevented with the use of the mesh-like electrode(s).

Embodiment 4

In this embodiment, an example in which a solid secondary battery is formed by a manufacturing method partly different from that in Embodiment 3 is described with reference to FIGS. 5A and 5B.

Figure 5A:
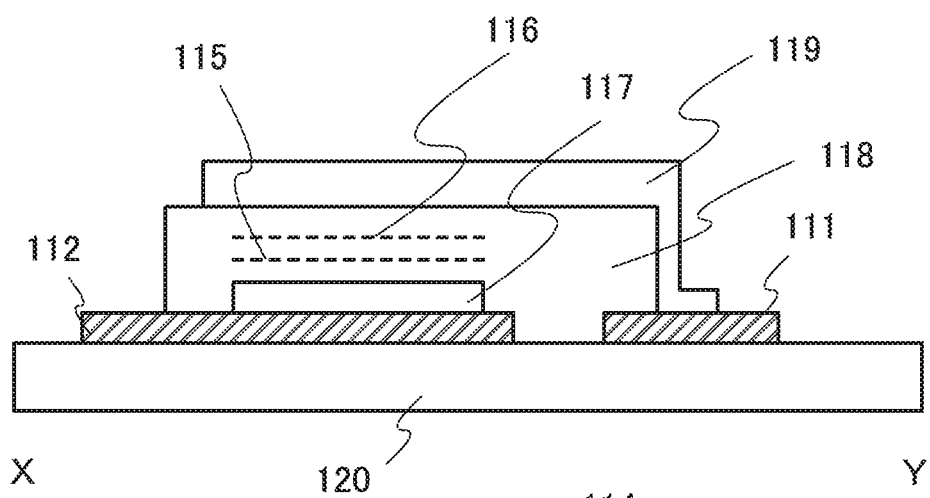
FIGS. 5A and 5B are an example of a cross-sectional view of and a top view of a storage battery.
Figure 5B:
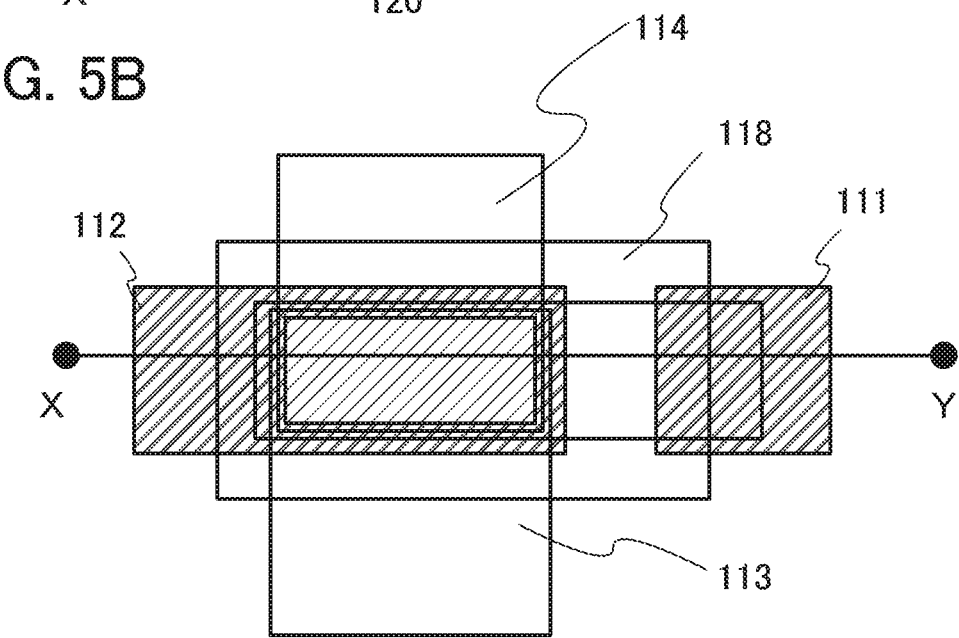

FIG. 5A is a cross-sectional structural view of a secondary battery, and FIG. 5B is a top view. A cross section taken along a solid line X-Y in FIG. 5B corresponds to FIG. 5A.

A substrate 120 is an element substrate in which a transistor whose channel is formed using single crystal silicon and a transistor whose channel is formed using an oxide semiconductor are stacked. A memory, a CPU, a protective circuit, a charge control circuit, and the like may be formed in the element substrate.

A conductive film is formed over the substrate 120 and patterning is performed, whereby the first terminal 111 and the second terminal 112 are formed. The first terminal 111 and the second terminal 112 are separate conductive layers. Note that in the case of being connected to a transistor in a lower layer, a contact hole that reaches an electrode layer in the lower layer is provided in advance and the conductive layer is formed.

Next, a negative electrode active material layer 117 is formed over the conductive layer of the second terminal. Selective formation is performed by a sputtering method using a mask having an opening.

Next, a solid electrolyte layer 118 is formed in three steps. After the first formation of the solid electrolyte layer, the third terminal 113 including a mesh-like electrode 115 is formed. Then, after the second formation of the solid electrolyte layer, the fourth terminal 114 including a mesh-like electrode 116 is formed. Then, after the third formation of the solid electrolyte layer, patterning is performed, so that the solid electrolyte layer 118 is formed.

Next, a positive electrode active material layer 119 that is in contact with the first terminal 111 and overlaps with the mesh-like electrodes 115 and 116 is formed. The positive electrode active material layer 119 is selectively formed by a sputtering method using a mask having an opening.

Then, although not illustrated in FIGS. 5A and 5B, a protective layer is formed over the positive electrode active material layer 119. Part of an upper surface of the third terminal and part of an upper surface of the fourth terminal are exposed and electrically connected to a current interruption circuit or a current control circuit. A signal for inhibiting self-discharge is applied, and control is performed so that the first terminal and the second terminal in the secondary battery are brought into an interruption state, whereby the self-discharge, i.e., the leakage current, of the secondary battery is reduced.

The substrate 120 is formed into a plurality of small-area chips in accordance with the area. One secondary battery may be formed in one chip, or two or more secondary batteries can be formed in one chip if capacity is needed. In the case where a plurality of secondary batteries is formed in one chip, a common signal can be used as signals input to the third terminal and the fourth terminal.

Although a four-terminal secondary battery is described in this embodiment, a three-terminal secondary battery may be formed.

This embodiment can be freely combined with any of the other embodiments.

Embodiment 5

In this embodiment, examples of an electronic device incorporating any of the secondary batteries described in Embodiments 1 to 4 will be described.

The secondary batteries described in Embodiments 1 to 4 are batteries that include three, four, or more terminals and that enable minimization of self-discharge and small leakage current; thus, an electronic device incorporating any of the batteries can be used for a long time.

The secondary batteries described in Embodiments 1 to 4 can be miniaturized, and can be mounted on a semiconductor chip such as an LSI. Furthermore, a small-size secondary battery is mounted on a chip incorporating a memory and a driver circuit for supporting data retention time of the memory is provided, whereby the storage time of the memory can be prolonged.

Examples of electronic devices using the secondary batteries described in Embodiments 1 to 4 are as follows: display devices (also referred to as televisions or television receivers) such as head-mounted displays, goggle type displays, and glasses-type displays, desktop or laptop personal computers, monitors for computers or the like, digital cameras, digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

In addition, any of the power storage devices described in Embodiments 1 to 4 can be incorporated along a curved inside/outside wall surface of a house or a building or a curved interior/exterior surface of a vehicle.

Figure 6A:
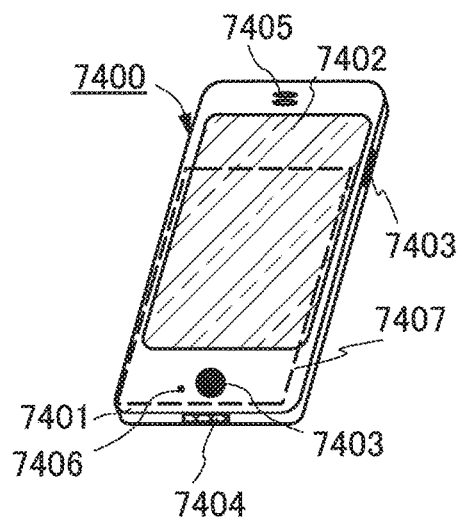
FIGS. 6A to 6D illustrate examples of mobile phones according to one embodiment of the present invention.

FIG. 6A illustrates an example of a mobile phone. A mobile phone 7400 includes, in addition to a display portion 7402 incorporated in a housing 7401, operation buttons 7403, an external connection port 7404, a speaker 7405, a microphone 7406, and the like. Note that the mobile phone 7400 includes a power storage device 7407.

Figure 6B:
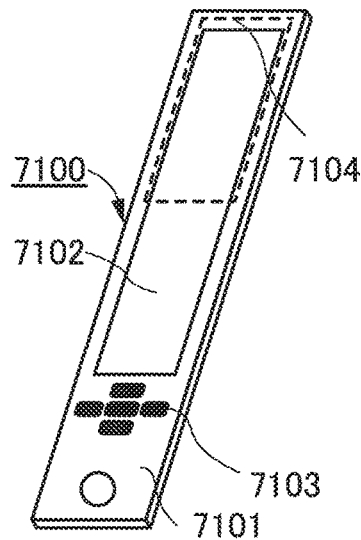
Figure 6C:
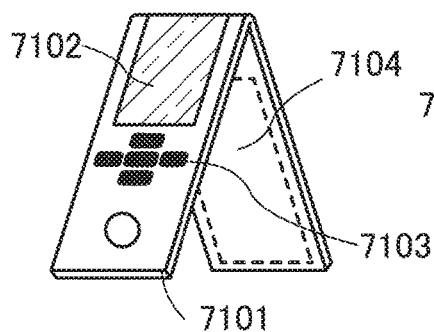
Figure 6D:
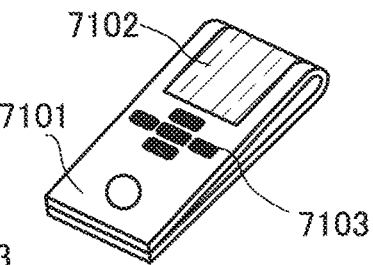

FIG. 6B illustrates an example of a mobile phone that can be bent. A mobile phone 7100 includes a housing 7101, a display portion 7102, operation buttons 7103, and a power storage device 7104. When the mobile phone illustrated in FIG. 6B is folded in the middle, a form illustrated in FIG. 6C can be obtained. When the middle of the mobile phone is further folded so that end portions of the mobile phone overlap with each other as illustrated in FIG. 6D, the mobile phone can be reduced in size so as to be put in, for example, a pocket of the user.

Figure 7A:
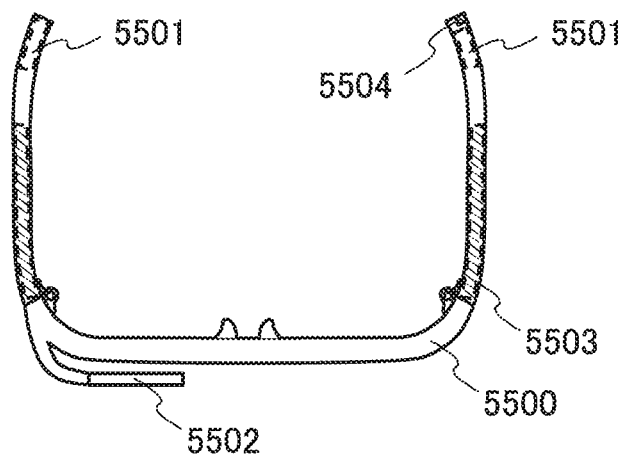
FIGS. 7A to 7C are top views and a perspective view of electronic devices.
Figure 7B:
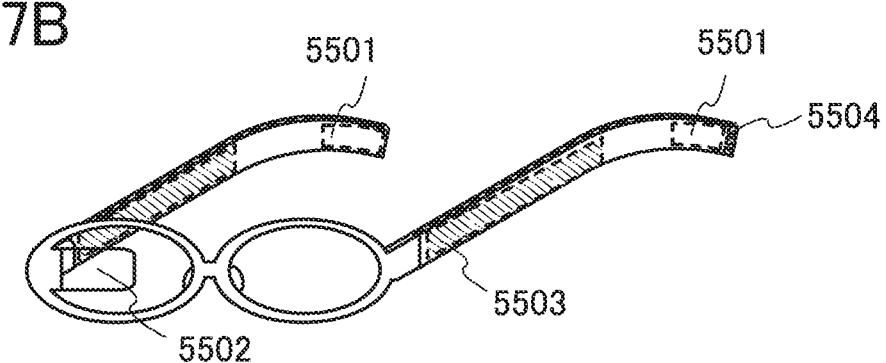

FIG. 7A is a top view of a glasses-type device 5500, and FIG. 7B is a perspective view thereof.

The glasses-type device 5500 includes portions that are positioned along sides of the head of the user when the device is worn, which are hereinafter referred to as temples, and a secondary battery 5501 is provided in each of the right and left temples. Any of the secondary batteries that are described in Embodiments 1 to 4 and have small leakage current is used as the secondary batteries 5501.

In addition, the glasses-type device 5500 may include a terminal portion 5504. The secondary batteries 5501 can be charged through the terminal portion 5504.

In addition, the glasses-type device 5500 may include a display portion 5502. Furthermore, a control portion 5503 may be included. The control portion 5503 can control charge and discharge of the secondary batteries 5501 and can generate image data that is displayed on the display portion 5502. Moreover, if a chip having a wireless communication function is included in the control portion 5503, data can be transmitted to and received from the outside.

Figure 7C:
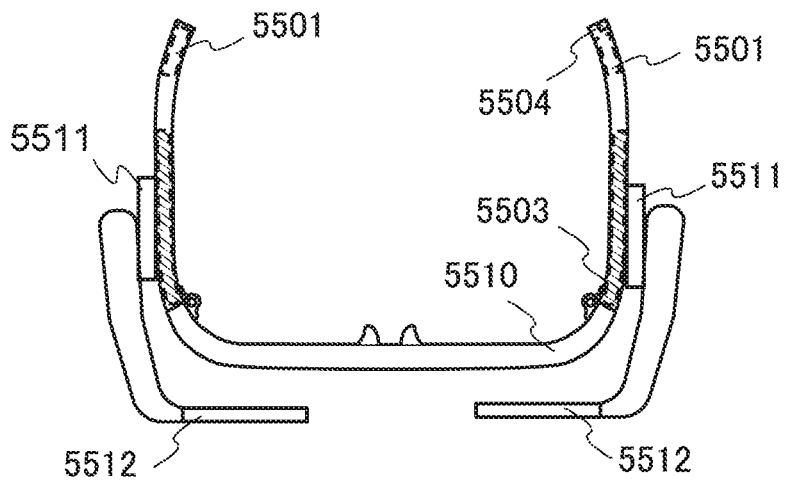

As illustrated in a top view of FIG. 7C, a glasses-type device 5510, which does not include the display portion 5502, may be provided. Instead of the display portion 5502, external display portions 5512 may be attached to the glasses-type device 5510 using hinges 5511. The distance between the display portions 5512 and the eyes of the user, the orientation of screens of the display portions 5512, and the like can be adjusted with the hinges 5511. When the external display portions 5512 are attached to the glasses-type device 5510, the distance between the eyes of the user and the display portions 5512 can be easily adjusted.

Although an example in which the display portions 5512 are provided on both the right and left sides is illustrated in the top view of FIG. 7C, there is no particular limitation and the display portion may be provided on one side.

When the display portions 5512 are not used, the hinges 5511 are rotated so that the display portions 5512 are slid and moved to positions at which the user's vision is not hindered.

Between the glasses-type device 5510 and the external display portions 5512, wireless communication and wireless power feeding may be performed.

By using the power storage devices described in Embodiments 1 to 4 in vehicles, next-generation clean energy vehicles such as hybrid electric vehicles (HEV), electric vehicles (EV), and plug-in hybrid electric vehicles (PHEV) can be achieved. Moreover, power storage devices that can be bent can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Figure 8A:
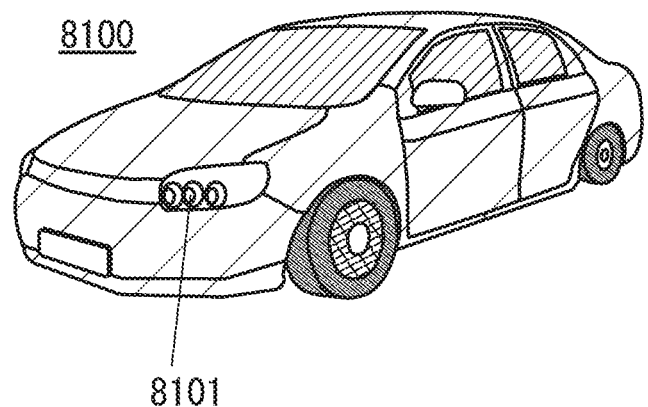
FIGS. 8A and 8B illustrate vehicles including secondary batteries.
Figure 8B:
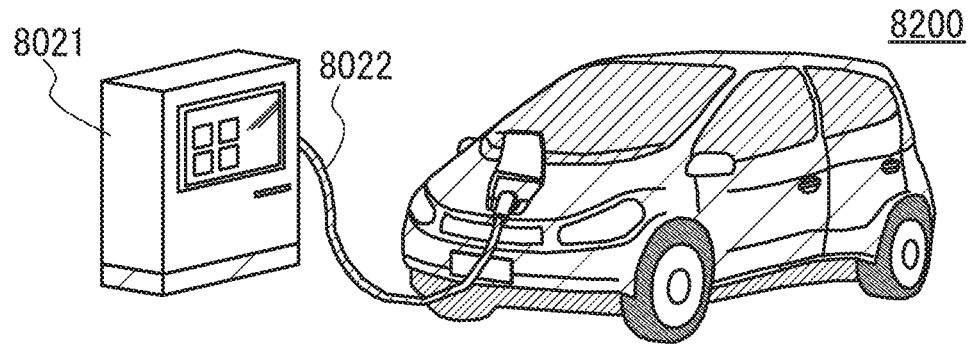

FIGS. 8A and 8B each illustrate an example of a vehicle using one embodiment of the present invention. An automobile 8100 illustrated in FIG. 8A is an electric vehicle that uses an electric motor as a power source. Alternatively, the automobile 8100 is a hybrid electric vehicle capable of driving appropriately using either an electric motor or an engine as a power source. In the case of providing a secondary battery in the vehicle, a battery module including a plurality of secondary batteries is placed in one place or more than one place.

The vehicle includes an electronic control system including a plurality of control circuits to which electric power is supplied from a main power source (main battery). A variety of devices and control circuits are mounted on the vehicle; some devices stop working while the vehicle is parked, whereas an alarm system or the like is kept being supplied constantly with electric power from the main power source even while the vehicle is parked. It is efficient and effective that each control system includes the small-size battery according to any one of embodiments of the present invention and operates without supply of electric power from a main power source. Furthermore, the vehicle includes an electric generator and can collect regenerative energy; the small-size battery according to any one of embodiments of the present invention is charged with electric power that cannot stored in the main battery, or a signal for inhibiting self-discharge is generated to be applied to the battery, whereby a battery with small leakage can be provided.

According to one embodiment of the present invention, a power storage device itself can be made more compact and lightweight, and for example, when the small-size power storage device is provided on the inside of a tire, a high-mileage vehicle can be achieved. Furthermore, a power storage device that can have various shapes can be provided in a small space in a vehicle, which allows a space in a trunk and a space for riders to be secured. The automobile 8100 includes the power storage device. The power storage device is used not only to drive the electric motor, but also to supply electric power to a light-emitting device such as a headlight 8101 or a room light (not illustrated).

The power storage device can also supply electric power to a display device of a speedometer, a tachometer, or the like included in the automobile 8100. Furthermore, the power storage device can supply electric power to a semiconductor device included in the automobile 8100, such as a navigation system.

An automobile 8200 illustrated in FIG. 8B can be charged when a power storage device included in the automobile 8200 is supplied with electric power through external charging equipment by a plug-in system, a contactless power feeding system, or the like. In FIG. 8B, a state is illustrated in which the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between two vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, since the power storage device can be miniaturized, the degree of flexibility in place where the power storage device can be provided is increased and thus a vehicle can be designed efficiently. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the mileage. Furthermore, the power storage device included in the vehicle can be used as a power source for supplying electric power to products other than the vehicle. In such a case, the use of a commercial power source can be avoided at peak time of electric power demand.

This embodiment can be freely combined with any one of Embodiments 1 to 3.

Note that what is described (or part thereof) in one embodiment can be applied to, combined with, or replaced with different contents (or part thereof) in the embodiment and/or what is described (or part thereof) in another embodiment or other embodiments.

Note that in each embodiment, what are described in the embodiment are contents described with reference to a variety of drawings or contents described with text described in this specification.

Note that by combining a drawing (or part thereof) illustrated in one embodiment with another part of the drawing, a different drawing (or part thereof) illustrated in the embodiment, and/or a drawing (or part thereof) illustrated in another embodiment or other embodiments, much more drawings can be formed.

Note that contents that are not specified in any drawing or text in the specification can be excluded from one embodiment of the invention. Alternatively, when the range of a value that is defined by the maximum and minimum values is described, the range is appropriately narrowed or part of the range is removed, whereby one embodiment of the invention excluding part of the range can be constituted. In this manner, it is possible to specify the technical scope of one embodiment of the present invention so that a conventional technology is excluded, for example.

As another specific example, the description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention. Note that even when the description "a value is preferably in a certain range" or "a value preferably satisfies a certain condition" is given, the value is not limited to the description. In other words, a description of a value that includes a term "preferable", "preferably", or the like does not necessarily limit the value.

As another specific example, the description "a voltage is preferably 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention.

As another specific example, the description "a film is an insulating film" is given to describe a property of a material. In that case, for example, it can be specified that the case where the insulating film is an organic insulating film is excluded from one embodiment of the invention. For example, it can be specified that the case where the insulating film is an inorganic insulating film is excluded from one embodiment of the invention. For example, it can be specified that the case where the film is a conductive film is excluded from one embodiment of the invention. For example, it can be specified that the case where the film is a semiconductor film is excluded from one embodiment of the invention.

As another specific example, the description of a stacked structure, "a film is provided between an A film and a B film" is given. In that case, for example, it can be specified that the case where the film is a stacked film of four or more layers is excluded from the invention. For example, it can be specified that the case where a conductive film is provided between the A film and the film is excluded from the invention.

Note that various people can implement one embodiment of the invention described in this specification and the like. However, different people may be involved in the implementation. For example, in the case of a transmission and reception system, the following case is possible: Company A manufactures and sells transmitting devices, and Company B manufactures and sells receiving devices. As another example, in the case of a light-emitting device including a transistor and a light-emitting element, the following case is possible: Company A manufactures and sells semiconductor devices including transistors, and Company B purchases the semiconductor devices, provides light-emitting elements for the semiconductor devices, and completes light-emitting devices.

In such a case, one embodiment of the invention can be constituted so that a patent infringement can be claimed against each of Company A and Company B. In other words, one embodiment of the invention can be constituted so that only Company A implements the embodiment, and another embodiment of the invention can be constituted so that only Company B implements the embodiment. One embodiment of the invention with which a patent infringement suit can be filed against Company A or Company B is clear and can be regarded as being disclosed in this specification or the like. For example, in the case of a transmission and reception system, even when this specification or the like does not include a description of the case where a transmitting device is used alone or the case where a receiving device is used alone, one embodiment of the invention can be constituted by only the transmitting device and another embodiment of the invention can be constituted by only the receiving device. Those embodiments of the invention are clear and can be regarded as being disclosed in this specification or the like. Another example is as follows: in the case of a light-emitting device including a transistor and a light-emitting element, even when this specification or the like does not include a description of the case where a semiconductor device including the transistor is used alone or the case where a light-emitting device including the light-emitting element is used alone, one embodiment of the invention can be constituted by only the semiconductor device including the transistor and another embodiment of the invention can be constituted by only the light-emitting device including the light-emitting element. Those embodiments of the invention are clear and can be regarded as being disclosed in this specification or the like.

Note that in this specification and the like, it may be possible for those skilled in the art to constitute one embodiment of the invention even when portions to which all the terminals of an active element (e.g., a transistor or a diode), a passive element (e.g., a capacitor or a resistor), and the like are connected are not specified. In other words, one embodiment of the invention is clear even when connection portions are not specified. Furthermore, in the case where a connection portion is disclosed in this specification and the like, it can be determined that one embodiment of the invention in which a connection portion is not specified is disclosed in this specification and the like, in some cases. In particular, in the case where the number of portions to which the terminal is connected may be more than one, it is not necessary to specify the portions to which the terminal is connected. Therefore, it may be possible to constitute one embodiment of the invention by specifying only portions to which some of terminals of an active element (e.g., a transistor or a diode), a passive element (e.g., a capacitor or a resistor), and the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function is specified, one embodiment of the present invention is clear. Moreover, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, part of a drawing or text described in one embodiment can be taken out to constitute one embodiment of the invention. Thus, in the case where a drawing or text related to a certain portion is described, the contents taken out from part of the drawing or the text are also disclosed as one embodiment of the invention, and one embodiment of the invention can be constituted. The embodiment of the present invention is clear. Therefore, for example, in a drawing or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part thereof is taken out, and one embodiment of the invention can be constituted. For example, from a circuit drawing in which N circuit elements (e.g., transistors or capacitors; N is an integer) are provided, it is possible to take out M circuit elements (e.g., transistors or capacitors; M is an integer, where M<N) and constitute one embodiment of the invention. For another example, it is possible to take out M layers (M is an integer, where M<N) from a cross-sectional view in which N layers (N is an integer) are provided and constitute one embodiment of the invention. For another example, it is possible to take out M elements (M is an integer, where M<N) from a flow chart in which N elements (N is an integer) are provided and constitute one embodiment of the invention. For another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a drawing or text described in one embodiment in this specification and the like, it will be readily appreciated by those skilled in the art that a broader concept of the specific example can be derived. Therefore, in the drawing or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a drawing (which may be part of the drawing) is disclosed as one embodiment of the invention, and one embodiment of the invention can be constituted. Therefore, when certain contents are described in a drawing, the contents are disclosed as one embodiment of the invention even when the contents are not described with text, and one embodiment of the invention can be constituted. In a similar manner, part of a drawing, which is taken out from the drawing, is disclosed as one embodiment of the invention, and one embodiment of the invention can be constituted. The embodiment of the present invention is clear.

REFERENCE NUMERALS

108: layer, 111: terminal, 112: terminal, 113: terminal, 114: terminal, 115: mesh-like electrode, 116: mesh-like electrode, 117: negative electrode active material layer, 118: solid electrolyte layer, 119: positive electrode active material layer, 120: substrate, 121: switch, 122: switch, 123: switch, 124: switch, 301: current collector, 302: active material layer, 303: organic resin layer, 304: conductive layer, 306: mesh-like electrode, 307: organic resin layer, 308: active material layer, 309: current collector, 400: storage battery, 402: positive electrode, 404: negative electrode, 5500: glasses-type device, 5501: secondary battery, 5502: display portion, 5503: control portion, 5504: terminal portion, 5510: glasses-type device, 5511: hinge, 5512: display portion, 7100: mobile phone. 7101: housing, 7102: display portion, 7103: operation button, 7104: power storage device, 7400: mobile phone, 7401: housing, 7402: display portion, 7403: operation button, 7404: external connection port, 7405: speaker, 7406: microphone, 7407: power storage device, 8021: charging apparatus, 8022: cable, 8100: automobile, 8101: headlight, and 8200: automobile.

The invention claimed is:
1. A power storage device comprising:
a first electrode;
a second electrode;
a layer between the first electrode and the second electrode;
at least one of a third electrode and a fourth electrode in the layer;
an electrolyte;
a first transistor; and
a second transistor,
wherein each of the first transistor and the second transistor comprises an oxide semiconductor comprising indium,
wherein each of the first electrode, the second electrode, the third electrode, and the fourth electrode is in contact with the electrolyte,
wherein the first electrode is electrically connected to one of a source and a drain of the first transistor,
wherein the third electrode is electrically connected to the other of the source and the drain of the first transistor,
wherein the second electrode is electrically connected to one of a source and a drain of the second transistor, and
wherein the fourth electrode is electrically connected to the other of the source and the drain of the second transistor.

2. The power storage device according to claim 1, wherein a signal is applied to at least one of the third electrode and the fourth electrode to change an electric field between the first electrode and the second electrode.

3. A power storage device comprising:
a first electrode;
a second electrode;
an organic resin layer between the first electrode and the second electrode;

at least one of a mesh-like third electrode and a mesh-like fourth electrode in the organic resin layer;

an electrolyte;

a first transistor; and a second transistor, wherein each of the first transistor and the second transistor comprises an oxide semiconductor comprising indium, wherein each of the first electrode, the second electrode, the mesh-like third electrode, and the mesh-like fourth electrode is in contact with the electrolyte, wherein the first electrode is electrically connected to one of a source and a drain of the first transistor, wherein the mesh-like third electrode is electrically connected to the other of the source and the drain of the first transistor, wherein the second electrode is electrically connected to one of a source and a drain of the second transistor, and wherein the mesh-like fourth electrode is electrically connected to the other of the source and the drain of the second transistor.

4. The power storage device according to claim 1, wherein the electrolyte is an electrolytic solution or a solid electrolyte.

5. The power storage device according to claim 1, wherein the power storage device is a lithium-ion secondary battery, a lithium-ion polymer secondary battery, or an all-solid-state thin-film lithium-ion secondary battery.

6. The power storage device according to claim 1, wherein the layer is a current interruption means or a current control means.

7. The power storage device according to claim 3, wherein a signal is applied to at least one of the mesh-like third electrode and the mesh-like fourth electrode to change an electric field between the first electrode and the second electrode.

8. The power storage device according to claim 3, wherein the electrolyte is an electrolytic solution or a solid electrolyte.

9. The power storage device according to claim 3, wherein the power storage device is a lithium-ion secondary battery, a lithium-ion polymer secondary battery, or an all-solid-state thin-film lithium-ion secondary battery.

* * * * *